July 8, 1969     E. J. CROOK, JR     3,453,822

COUPLING LINK

Filed Jan. 16, 1967

INVENTOR
EDWARD J. CROOK JR.

BY
Burd Mac Eachron Braddock
Barty + Schwartz
ATTORNEYS

United States Patent Office 3,453,822
Patented July 8, 1969

3,453,822
COUPLING LINK
Edward J. Crook, Jr., Fort Wayne, Ind., assignor to American Hoist & Derrick Company, St. Paul, Minn., a corporation of Delaware
Filed Jan. 16, 1967, Ser. No. 609,636
Int. Cl. F16g *13/06, 13/08*
U.S. Cl. 59—85                                                6 Claims

ABSTRACT OF THE DISCLOSURE

A coupling link having two identical half links having mating ears held together by a uniform diameter pin. A uniform dimension spring steel longitudinally split locking sleeves having a lesser nominal inner diameter than the pin is in clamping relation with the pin to virtually fill the space between the spaced ears. The pin is driven longitudinally through the ears and into the end of the sleeve to assemble the link and out of the ears and sleeve to disassemble the link.

BACKGROUND OF THE INVENTION

Coupling links with pins which may be driven into position to hold the links assembled and driven out to disassemble the links have suffered from the disadvantages of wearing of parts so that after several couplings and uncouplings, the parts are no longer as firmly and safely associated as they were when first used.

Also either the pins or the ears have been of special construction so that the pins can be driven into interfering relation with another part to attempt to positively fix the pin in holding relation to the ears until driven out to uncouple the link. In addition to being subject to wearing out, such parts have been relatively expensive to construct.

Coupling links of the prior art subject to the foregoing problems include those shown in U.S. Patents Nos. 3,134,221, 3,241,309, 1,513,729, 2,972,223 and 3,104,519.

SUMMARY OF INVENTION

In the present invention two identical link halves are each provided with mating ears having holes of a single uniform internal diameter passing therethrough. A coupling pin of constant outside diameter mates with the holes in these ears in an easy slip fit. The pin has a chamfer at each end. A locking sleeve of hardened tempered spring steel or the like of generally cylindrical shape has a slot therein extending from one end to the other, and has an internal chamfer at each end. The nominal inner diameter of the sleeve is less than the outside diameter of the pin and the length of the sleeve is such as to virtually fill the space between the spaced ears when the pin has been slipped through the ears on one side of the link and driven through the sleeve and into the ears on the other side of the link.

The sleeve firmly grips the pin as its inner diameter is forced to conform to the outer diameter of the pin; and is immovable with respect to it until the pin is driven from the link to disassemble the link. The ends of the sleeve strike against the inner surfaces of the ears preventing longitudinal movement of the pin with respect to the ears as long as the link remains coupled.

DESCRIPTION OF PREFERRED EMBODIMENT

Figure 1:
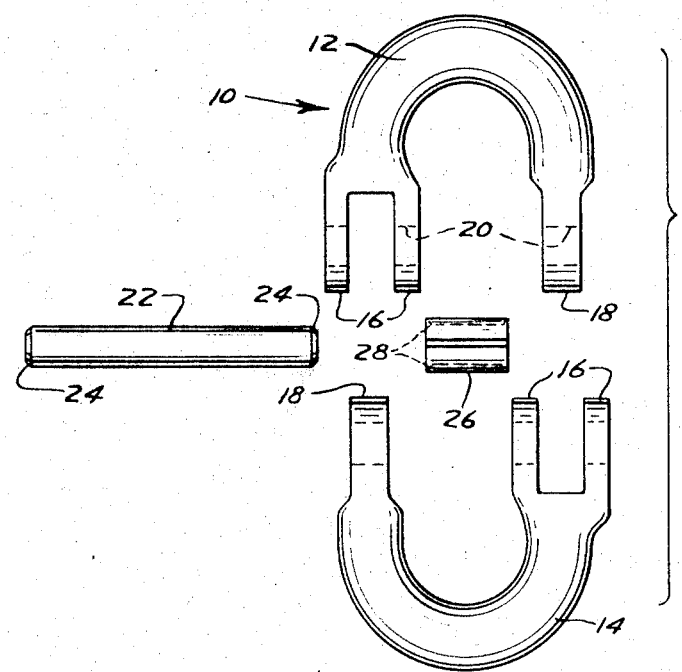
FIG. 1 is an exploded elevational view of a disassembled coupling link of the invention.

In the drawings, a coupling link 10 includes identical half links 12 and 14, each of which are provided with two ears 16 and an ear 18, all having identical concentric holes 20 therethrough to receive a coupling pin 22. The half links can be made of forged steel while the pin can be of heat treated steel. The pin is of uniform diameter throughout of size to slip easily into and through holes 20, and is provided with a chamfer 24 at each end.

To positively fix the longitudinal relationship of the pin with respect to the ears 16 and 18 to hold the link in assembled relation, a split locking sleeve 26 is provided which has a nominal uniform inner diameter less than the outside diameter of the pin 22 but greater than the minimum diameter of at least one of the chamfers 24. It can be of heat treated spring steel, is provided with inner chamfers 28, and will be of a length to fit easily between the inner facing surfaces of the matching inner ears 16 of the half links 12 and 14 when the half links are in assembled mating relationship to each other.

Figure 2:
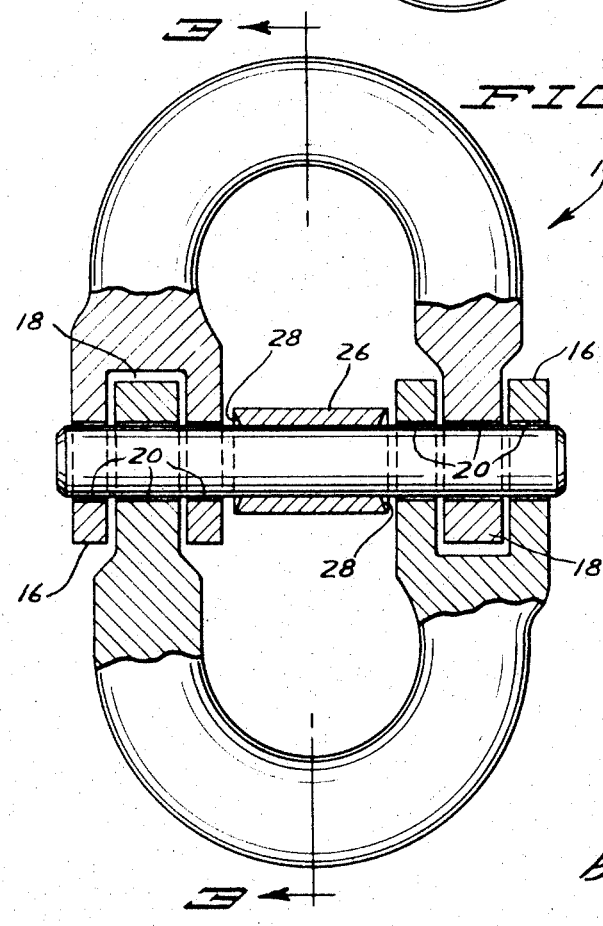
FIG. 2 is an elevational view of the same link in assembled condition with parts in section and parts broken away.
Figure 3:
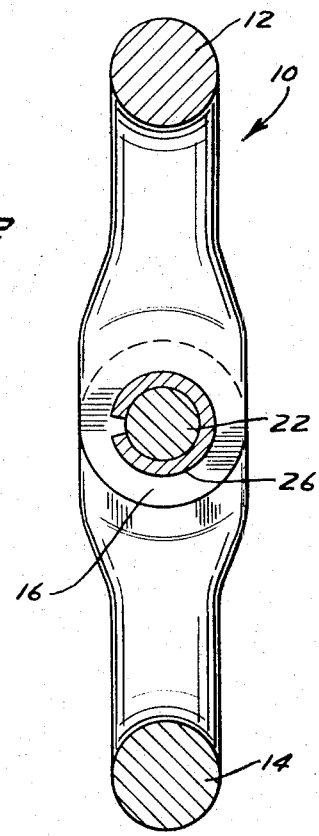
FIG. 3 is a sectional view taken on line 3—3 in FIG. 2.

With the parts so positioned and with the sleeve 26 in concentric relation to holes 20, pin 22 will be passed through a first set of the mated ears 16 and 18 of half links 12 and 14, respectively, for example, so that chamfer 24 of the pin is in contact with chamfer 28 of the sleeve. The pin will then be driven, as with a hammer into and through sleeve 26 and into the remaining ears positioned as shown in FIG. 2.

The force of the clamping action of sleeve 26 on pin 22 due to the expansion of the sleeve to have an inner diameter equal to that of the outer diameter of the pin is such that there can be no longitudinal movement of one with respect to the other until a hammer and a driving rod are used to drive the pin from the sleeve and out from holding relation with the ears when it is desired that the links should be uncoupled.

Until that time, the outer ends of the sleeve are held by the innermost facing surfaces of the ears 16 of each half link in fixed longitudinal position, thereby also safely and firmly fixing the longitudinal position of the pin inside of all the ears 16 and 18 of both half links.

The expansion of the sleeve to have an inner diameter equal to that of the pin as the pin is driven through the sleeve, initiates a clamping action between the two which extends over the entire length of the sleeve. The holding force of such action is not dependent on any deformation of the pin, so both it and the sleeve can be hard enough so that even repeatedly driving the pin into and out of the sleeve will cause no noticeable or appreciable wear or change in the appearance, shape or strength of the parts. Also, because the ends of the sleeve can rotate freely with respect to the facing surfaces of the ears 16, any incidental or purposeful rotation of one of the half links with respect to the other about the axis of the pin will cause no deleterious affect on any of the parts.

When driving the pin out of the sleeve, the parts do not change in relative size with initial longitudinal movement, one with the other. Thus no strain or stress is exerted on the parts which would wear or rupture them as is the case in some of the prior art structures where a spring clip must be forced out of a groove in a holding pin to begin withdrawal of the pin from the link.

I claim:
1. In combination: a coupling link including two mating half links each having first and second spaced apart ears with concentric holes of uniform diameter, a coupling pin having a length to extend between said spaced apart ears and through said holes in said ears, said pin having a uniform diameter throughout its length slightly smaller than the uniform diameter of said holes so that the pin has a slip fit with said ears, a resilient longitudinally split locking sleeve of length to extend between said spaced apart ears, said sleeve having ends located in contiguous relation with facing insides of the ears and uniform inner diameter less than the diameter of said pin by a dimension such that said sleeve will be firmly clamped on said pin over the entire length of the sleeve when said pin has passed through said first ears, driven through said sleeve and into said second ears.

2. The combination as specified in claim 1 wherein the pin is provided with a chamfer at at least one of its ends.

3. The combination as specified in claim 2 wherein the sleeve is provided with an internal chamfer at at least one of its ends.

4. The combination as specified in claim 3 wherein the longitudinal split in said sleeve extends from end to end of said sleeve in straight line parallel relation to the axis thereof.

5. The combination as specified in claim 1 wherein the pin has a length greater than the maximum width of the joined ears.

6. The combination as specified in claim 5 wherein the pin has a chamfer on at least one of its ends.

References Cited

UNITED STATES PATENTS

| | | | |
|---|---|---|---|
| 1,513,729 | 11/1924 | Adams | 59—85 |
| 2,837,890 | 6/1958 | Morrill | 59—86 |
| 2,972,223 | 2/1961 | Devonshire | 59—88 |
| 3,104,519 | 9/1963 | Kelting | 59—86 |
| 3,134,221 | 5/1964 | Bergman | 59—85 |
| 3,241,309 | 3/1966 | Mason | 59—85 |

FOREIGN PATENTS 731,881   4/1966   Canada.

CHARLES W. LANHAM, *Primary Examiner.*

G. P. CROSBY, *Assistant Examiner.*